(12) United States Patent
Skinner

(10) Patent No.: US 6,937,679 B2
(45) Date of Patent: Aug. 30, 2005

(54) SPREAD SPECTRUM CLOCKING TOLERANT RECEIVERS

(75) Inventor: Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 10/034,398

(22) Filed: Dec. 26, 2001

(65) Prior Publication Data

US 2003/0118137 A1 Jun. 26, 2003

(51) Int. Cl.[7] .................................................. H04L 7/00
(52) U.S. Cl. ....................... 375/355; 375/371; 375/373; 375/375
(58) Field of Search ............................... 375/355–376, 375/324, 354

(56) References Cited

U.S. PATENT DOCUMENTS

| | | | |
|---|---|---|---|
| 5,696,800 A | | 12/1997 | Berger |
| 5,867,542 A | * | 2/1999 | Iwamatsu et al. ........... 375/354 |
| 6,057,730 A | | 5/2000 | Yamamoto |
| 6,236,697 B1 | * | 5/2001 | Fang ........................... 375/376 |
| 6,347,128 B1 | * | 2/2002 | Ransijn ....................... 375/376 |

FOREIGN PATENT DOCUMENTS

| | | |
|---|---|---|
| EP | 0732829 A2 | 9/1996 |
| EP | 0732829 A3 | 9/1999 |
| WO | WO96/27943 | 9/1996 |

OTHER PUBLICATIONS

Steve Bolger and Samer Omar Darwish, Use Spread–Spectrum Techniques to Reduce EMI, EDN Design Feature, May 21, 1998 issue, pp. 141, 142, 144, 146, 148 Copy of PCT Search Report. Mar. 25, 2003.

* cited by examiner

Primary Examiner—Stephen Chin
Assistant Examiner—Curtis Odom
(74) Attorney, Agent, or Firm—Alan K. Aldous (57) ABSTRACT

In some embodiments, the invention includes a system having a clock recovery circuitry to receive a data signal and a reference clock signal and in response thereto to produce an in phase clock signal which is in phase with the data signal and mirrors frequency changes in the data signal, wherein the data signal has embedded clock information and a varying frequency. The system also includes a receiving gate to receive the data signal and the in phase clock signal and to gate the data signal to produce a gated data signal in response to the in phase clock signal. Other embodiments are described and claimed.

21 Claims, 6 Drawing Sheets

SPREAD SPECTRUM CLOCKING TOLERANT RECEIVERS

BACKGROUND OF THE INVENTION

1. Technical Field of the Invention

The present invention relates to semiconductor transmitting and receiving chips and, more particularly, to receivers in the receiving chips that are spread spectrum clocking tolerant.

2. Background Art

Figure 1:
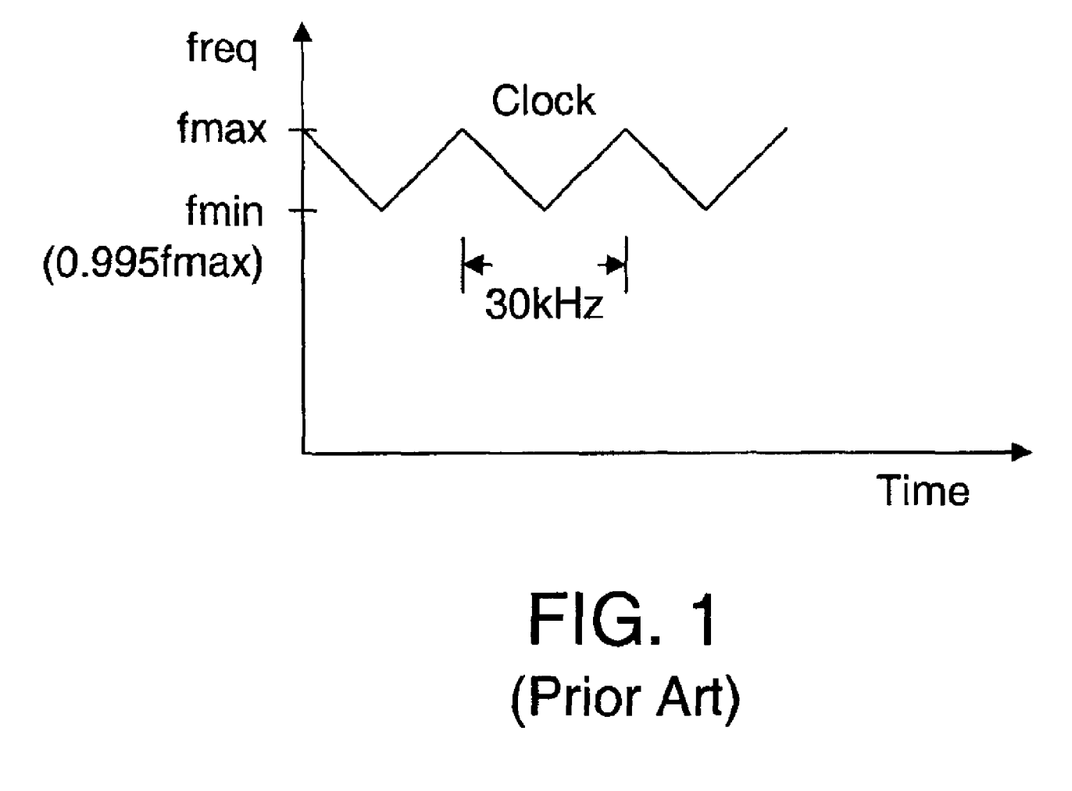
FIG. 1 illustrates a time versus frequency graph of a clock using a commonly used spread spectrum clocking.

Spread spectrum clocking (SSC) has become ubiquitous in the personal computer industry for controlling electromagnetic emissions. FIG. 1 illustrates a typical SSC scheme in which the frequency of a clock signal changes in a triangular waveform between a maximum frequency (fmax) and a minimum frequency (fmin) that is equal to 0.995 fmax. The frequency of triangular waveform is typically about 30 kHz. However, fmax is many times greater (e.g., 100 MHz or higher).

In desktop personal computers, where common clock architectures dominate, the impact of SSC is minimal and, currently, no design changes are generally required to reap electromagnetic interference (EMI) benefit from SSC, which may be any where up to around 20 dB. Accordingly, almost all personal computer systems shipped today have SSC implemented.

In some computer systems and communications devices and systems, a clock is embedded in the data for input/output (I/O) or other signals. An example of a data signal with an embedded clock is one using the 8b/10b (8-bit/10-bit) coding scheme. A receiver including a receiving gate that gates the data signal to produce a gated data signal. The receiver also include clock recovery circuitry to extract clock information to create a signal to clock the receiving gate. To date, SSC proliferation in embedded clock systems has been limited due to the inability of present receivers to track the kHz modulation frequency variations. That is, the receivers have difficulty differentiating between deliberate frequency changes and unintentional jitter on the clock. An example of such a receiver is an interpolator based receiver. In some interpolator based receivers, a local reference clock is used in conjunction with the embedded clock information to determine the optimum timing for gating data.

Figure 2:
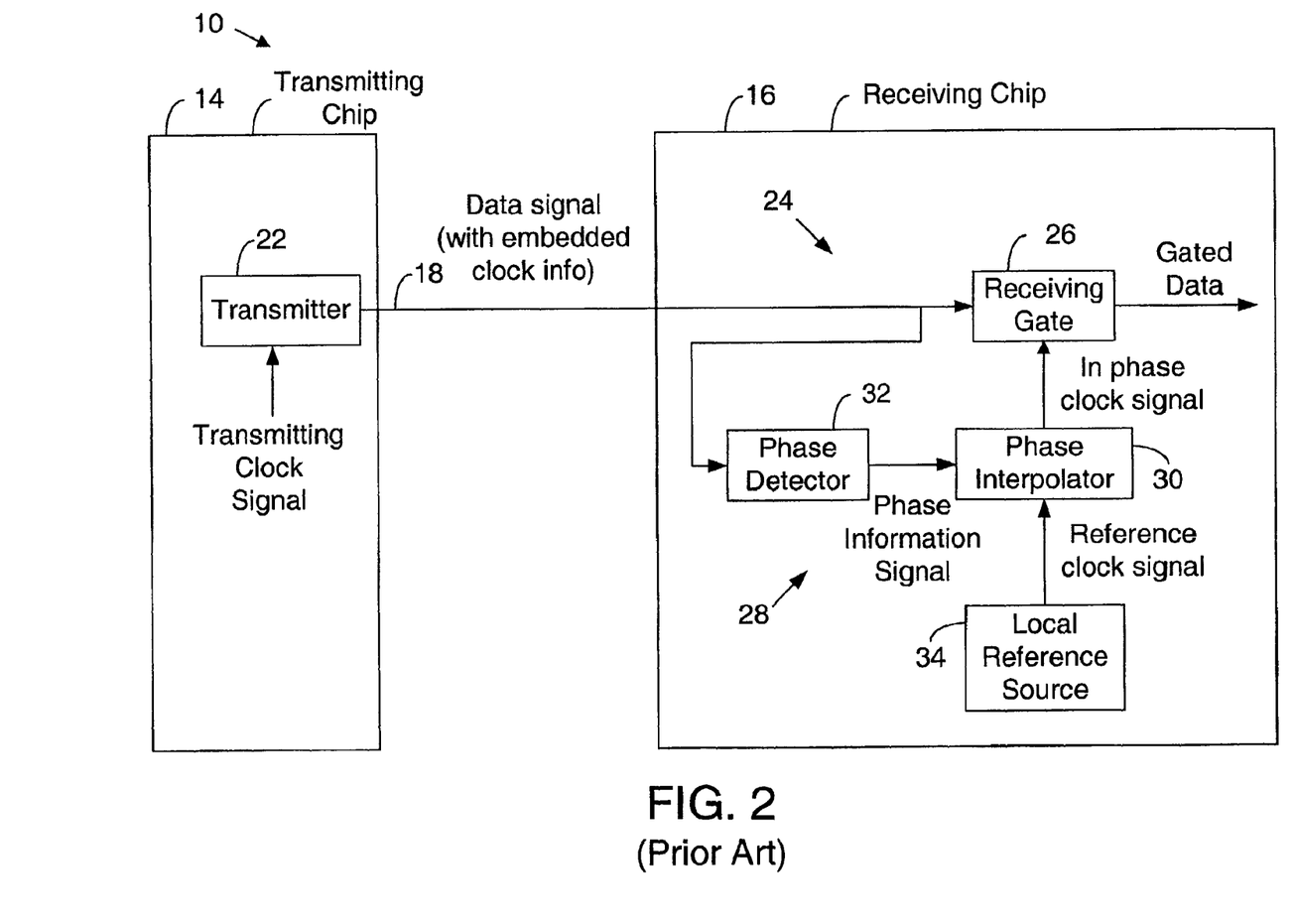
FIG. 2 is a schematic representation of a prior art system having a transmitting and receiving chip wherein the receiving chip includes an interpolator based receiver.

For example, FIG. 2 illustrates a prior art system 10 in which a transmitting chip 14 transmits a data signal with embedded clock information to a receiving chip 16 over an interconnect 18. The clock information may be embedded through a coding technique such as 8b/10b or some other technique. Transmitter 22, in transmitting chip 14, transmits the data signal in response to a transmitting clock signal that has a constant frequency rather than SSC. Transmitter 22, interconnect 18, and an interpolator based receiver 24 in receiving chip 16 may form a point to point serial link. Receiver 24 includes a receiving gate 26 and clock recovery circuitry 28. In the example of FIG. 2, the clock recovery circuitry 28 includes a phase detector 32 (for example, an edge detector) and a phase interpolator 30. Receiving gate 26 receives the data signal on interconnect 18 and a clock signal from phase interpolator 30 referred to herein as the "in phase clock signal" because it is in phase with the data signal on interconnect 18. The in phase clock signal gates receiving gate 26 to produce the gated data signal from the data signal on interconnect 18.

Phase detector 32 analyzes the data signal on interconnect 18 to extract phase information regarding the data signal. The phase information is included in a phase information signal provided to phase interpolator 30. A local reference source 34 provides a reference clock signal which has a frequency which is very close (and ideally identical) to the frequency of the transmitting clock signal provided to transmitter 22. Phase interpolator 30 creates the in phase clock signal through using the reference clock signal from local reference source 34 and the phase information signal from phase detector 32.

As noted, the transmitting clock signal applied to transmitter 22 has a constant frequency. (Of course, there is some unintended jitter in the clock.) If instead, a SSC clock, were applied to transmitter 22, interpolator 30 would not, in many cases, be able to differentiate between the deliberate frequency movement of SSC and the unintentional jitter on the clock. Accordingly, the in phase clock signal would not always actually be in phase and some of the data signal would not be gated at a correct time.

There are various ways in which to implement an interpolator based receiver such as the one shown in system 10 of FIG. 2. It takes time for phase detector 32 and phase interpolator 30 to perform their functions. Under one approach, there is a delay in receiving gate 26 so that the portion of the data signal that is being gated is gated by an in phase clock signal generated through phase interpolator 30 and phase detector 32 in response to the same portion of the data signal. Under another approach, there is no delay or just a slight delay so that a portion of the data signal is gated in response to a portion of the in phase clock signal generated in response to a previous portion of the data signal. This is not a problem since the phase of the data signal rarely would change much over such a short amount of time. The phase detector 32 might merely sample some portions of the data signal. Other control circuitry can be used in connection with, for example, test patterns to obtain or retain the in phase clock signal. In some implementations, the edge detector receives data from the output of receiving gate 26 rather than at the input.

BRIEF SUMMARY OF THE INVENTION

Briefly, in some embodiments, the inventions include a system having clock recovery circuitry to receive a spread spectrum data signal and a reference clock signal and in response thereto to produce an in phase clock signal which is in phase with the data signal and mirrors frequency changes in the data signal. The data signal has embedded clock information and a varying frequency. The system further includes a receiving gate to receive the data signal and the in phase clock signal and to gate the data signal to produce a gated data signal in response to the in phase clock signal.

Other embodiments are described and claimed.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The invention involves SSC tolerant clock recovery circuitry that provides to a receiving gate, an in phase clock signal that is in phase with a data signal and mirrors frequency changes in the data signal and with the SSC transmitting clock which causes the SSC changes in frequency. In this way, the invention solves the limitations of the prior art system. FIGS. 3–6 illustrate some embodiments of the invention. However, it should be stressed that the invention is not limited to these details. The SSC tolerant nature of the receiver can be implemented with other circuits.

Figure 3:
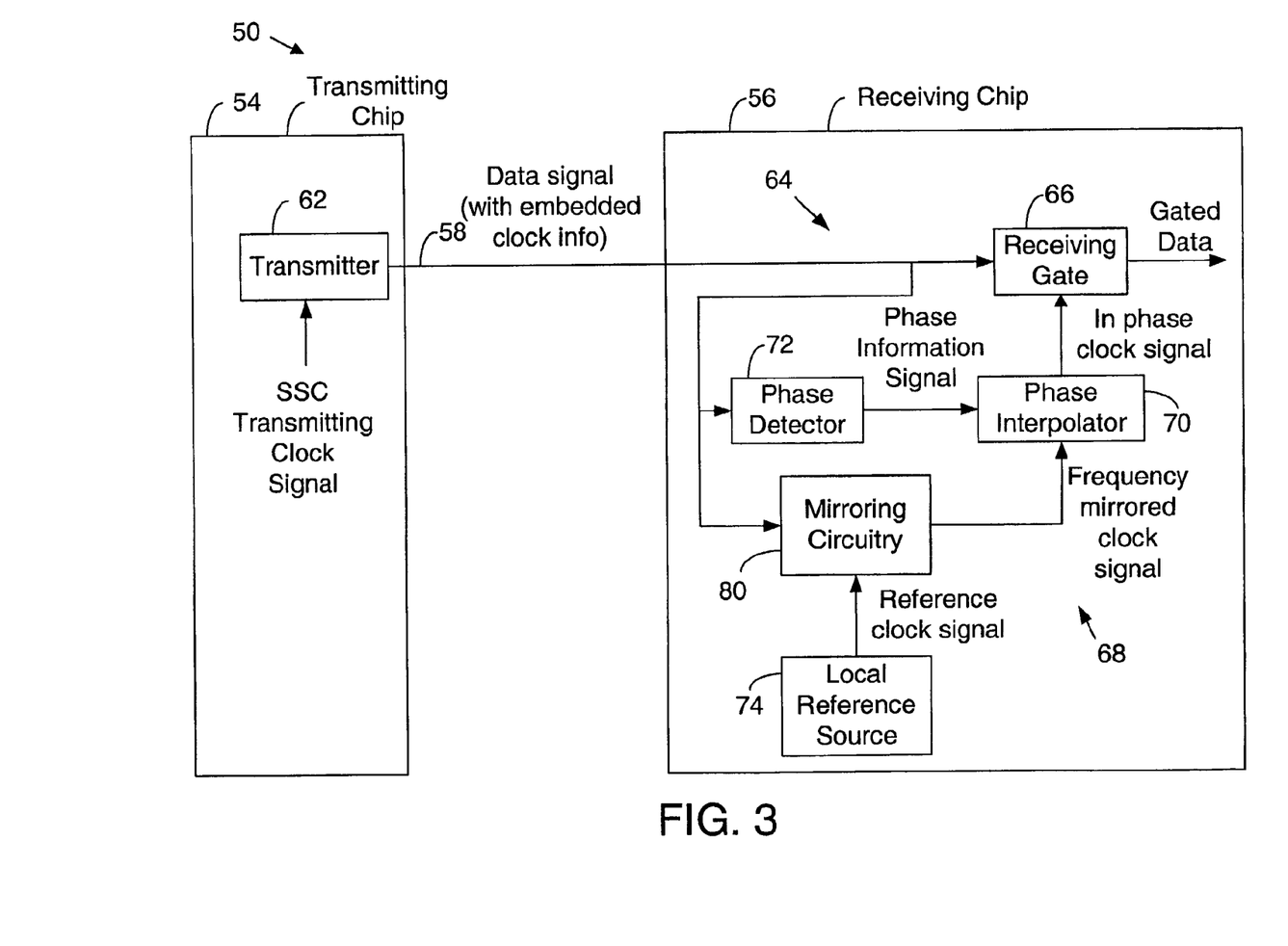
FIG. 3 is a schematic representation of a system having a transmitting and receiving chip wherein the receiving chip includes an SSC tolerant interpolator based receiver according to some embodiments of the invention.

FIG. 3 illustrates a system 50 in which a transmitting chip 54 transmits a data signal with embedded clock information to a receiving chip 56 over an interconnect 58. The clock information may be embedded through a coding technique such as 8b/10b or some other technique. Transmitter 62, in transmitting chip 54, transmits the data signal in response to an SSC transmitting clock signal. SSC transmitting clock signal may have the characteristics of the signal in prior art FIG. 1 or be somewhat different. For example, the difference in fmax and fmin could be greater or less and the frequency of change could be greater or less than is shown in FIG. 1. The data signal may have a phase change or other change that tracks the frequency change in the SSC transmitting clock signal. Transmitter 62, interconnect 58, and a receiver 64 in receiving chip 56 may form a point to point serial link, but the invention is not restricted to point to point. Interconnect 58 may be unidirectional or bidirectional. Interconnect 58 may be differential or single ended.

Receiver 64 includes a receiving gate 66 and a clock recovery circuitry 68. In the embodiment of FIG. 3, clock recovery circuitry 68 includes a phase detector 72, a phase interpolator 70, and mirroring circuitry 80 to create a frequency mirrored clock signal. In the example of FIG. 3, receiver 64 is an interpolator based receiver. Phase detector 72 analyzes the data signal on interconnect 58 to extract phase information regarding the data signal. Phase detector 72 may use edge detection (such as cell edge detection) or some other means of phase detection. The phase information is included in a phase information signal provided to phase interpolator 70. A local reference source 74 produces a reference clock signal which has a frequency which is very close (and ideally identical) to, for example, the maximum or minimum frequency of the SSC transmitting clock signal provided to transmitter 62. However, the reference clock signal has a constant frequency (although it will have some jitter). Local reference source 74 may be internal or external to receiving chip 56.

Phase interpolator 70 creates the in phase clock signal through using the frequency mirrored clock signal and the phase information signal. Receiving gate 66 receives the data signal on interconnect 58 and the in phase clock signal from phase interpolator 70. Because the frequency mirrored clock signal mirrors frequency changes in the data signal, the in phase clock signal will be in phase with the data signal and will gate receiving gate 66 at correct times. The in phase clock signal gates receiving gate 66 to produce the gated data signal from the data signal on interconnect 58.

Figure 4:
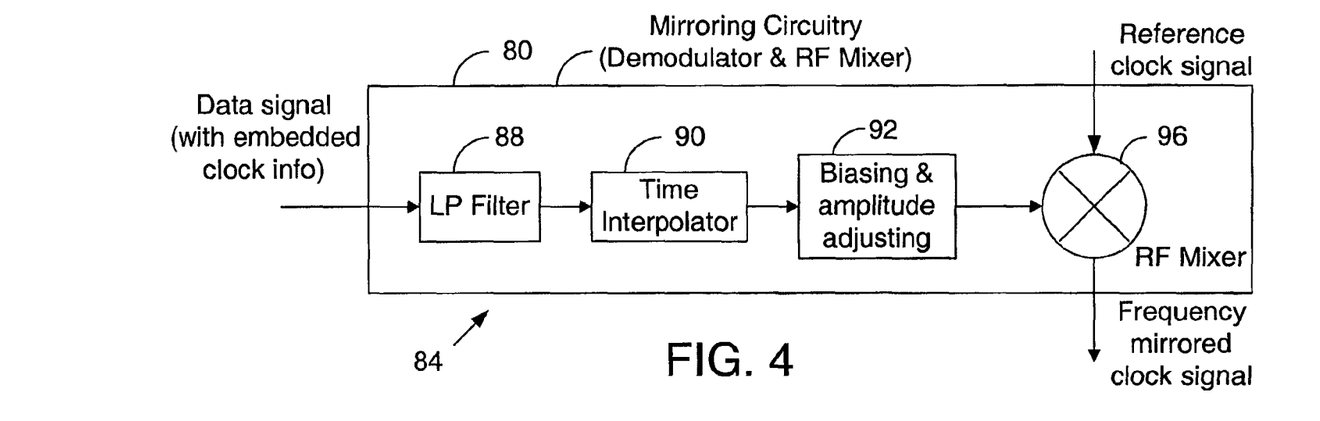
FIG. 4 is a schematic representation of a details of a demodulator and RF mixer shown in FIG. 3 according to some embodiments of the invention.
Figure 5:
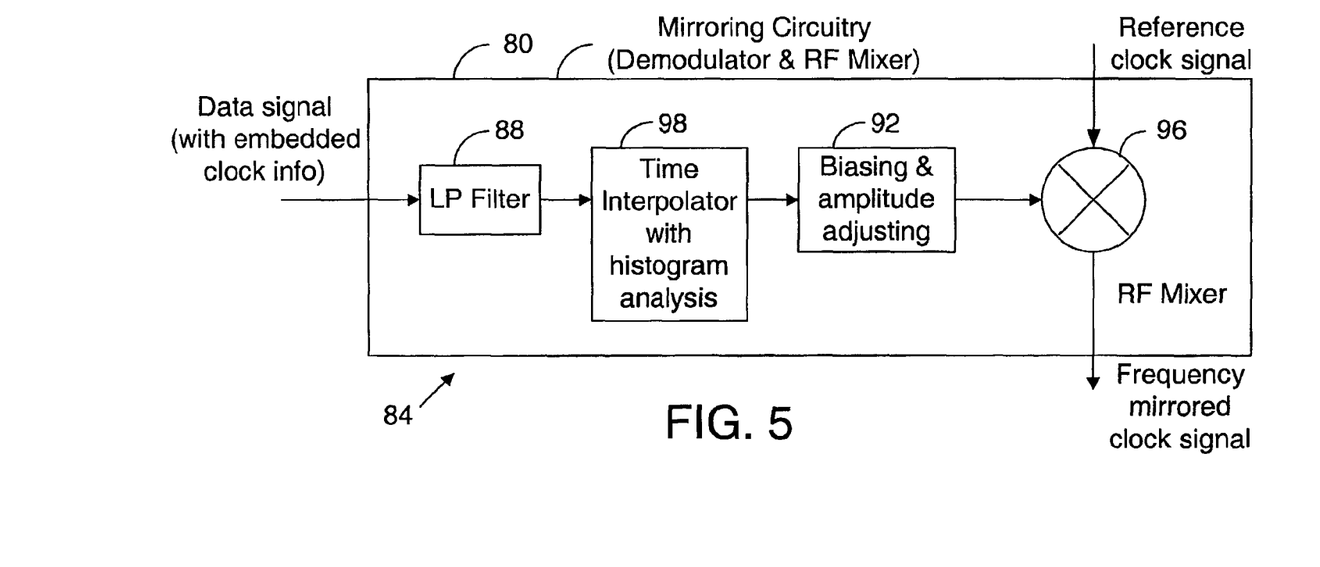
FIG. 5 is a schematic representation of a details of a demodulator and RF mixer shown in FIG. 3 according to some embodiments of the invention.

Mirroring circuitry 80 produces the frequency mirrored clock signal that is provided to phase interpolator 70. There are various ways in which mirroring circuitry 80 can be implemented. One way is through demodulating and RF mixer circuitry, examples of which are illustrated in FIGS. 4 and 5, but the invention is not restricted thereto. Referring to FIG. 4, in some embodiments, mirroring circuitry 80 is demodulator and RF mixer circuitry which includes a low pass filter 88 which extracts the low frequency change in frequencies between fmax and fmin. In the case of FIG. 1, there is a 30 kHz change in frequency between fmax and fmin. (Note that the SSC transmitting clock signal does not have to be a triangular shaped wave.) If the SSC transmitting clock signal of FIG. 3 were the clock of FIG. 1, then the output of low pass filter 88 would be primarily or exclusively components of a 30 kHz signal. Because of the coding (e.g., 8b/10b coding), the output of low pass filter 88 may be points rather than continuous wave.

Time interpolator 90 creates a continuous or relatively continuous wave (which may look like that of FIG. 1.) Changes in frequency in the data signal may be translated into changes in amplitude in the output of time interpolator 90. Time interpolator 90 may include histogram analysis to improve efficiency and/or handle changes in direction around fmax and/or fmin. Referring to FIG. 5, time interpolator 98 is shown including the histogram analysis which uses information regarding previously detected waveforms to help more quickly find the correct current waveform. Biasing & amplitude adjusting circuitry 92 makes sure the continuous or relatively continuous wave output of time interpolator 90 or 98 has a proper bias and amplitude to be suitable for an RF mixer 96. RF mixer 96 frequency modulates the output of biasing and amplitude adjusting circuitry 92 with the reference clock signal to produce the frequency mirrored clock signal provided to phase interpolator 70. RF mixer 96 might be called an FM block (frequency modulator block) because RF mixer 96 does frequency modulation. However, the frequencies do not have to be in the radio or FM frequency ranges. As noted, the details of circuitry to create a frequency mirrored clock signal can be somewhat different than those shown in FIGS. 4 and 5.

There are various ways in which to implement an interpolator based receiver such as the one shown in FIG. 3. It takes time for phase detector 72, phase interpolator 70, and mirroring circuitry 80 to perform their functions. Under one approach, there is a delay in receiving gate 66 so that the portion of the data signal that is being gated is gated by an in phase clock signal generated through phase interpolator 70, phase detector 72, and mirroring circuitry 80 in response to the same portion of the data signal. Under another approach, there is no delay or just a slight delay so that a portion of the data signal is gated in response to a portion of the in phase clock signal generated in response to a previous portion of the data signal. This is not a problem since the phase of the data signal rarely would change much over such a short amount of time. The phase detector 72 might merely sample some portions of the data signal. Other control circuitry can be used in connection with, for example, test patterns to obtain or retain the in phase clock signal.

Figure 6:
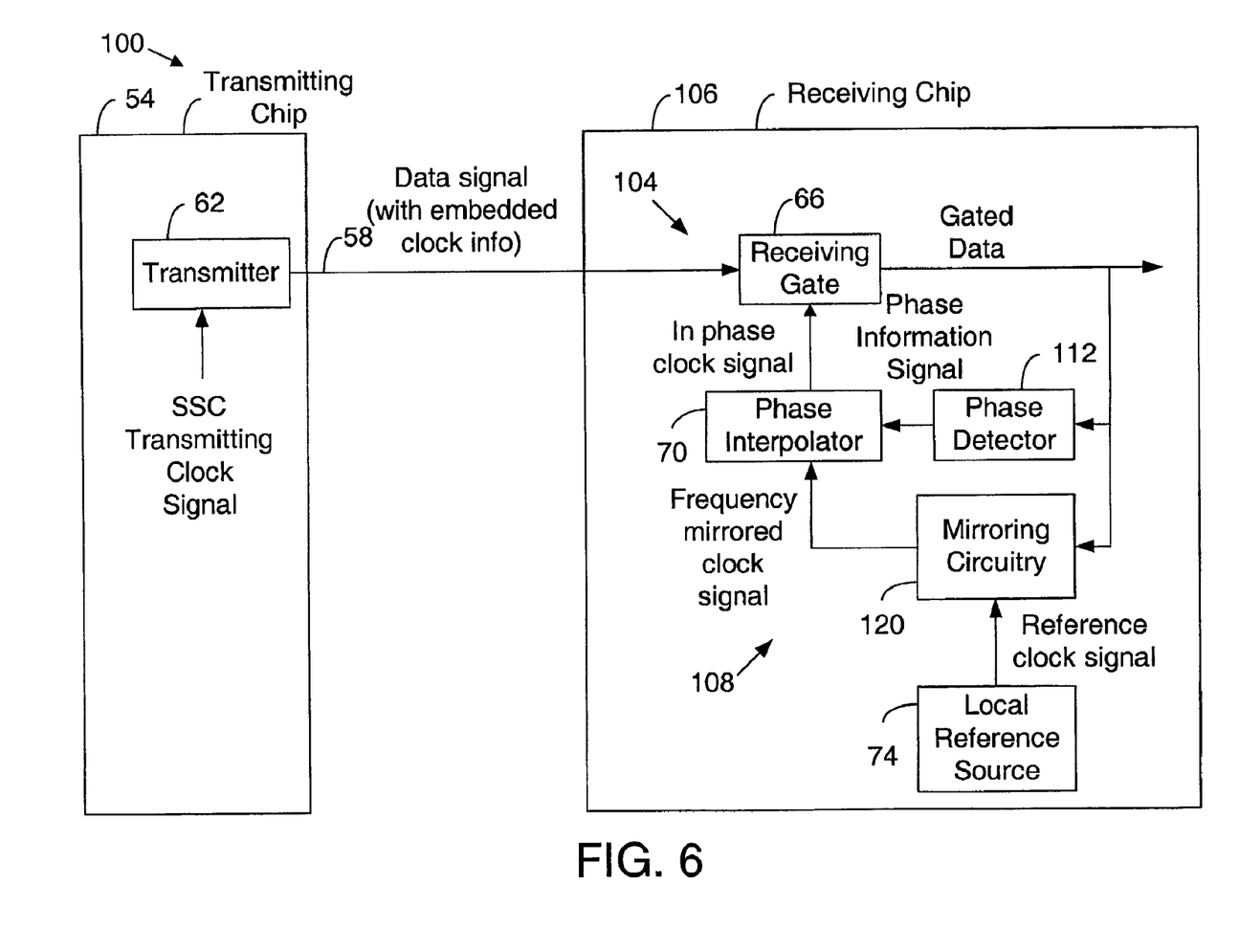
FIG. 6 is a schematic representation of a system having a transmitting and receiving chip wherein the receiving chip includes an SSC tolerant interpolator based receiver according to some embodiments of the invention and is an alternative to the implementations of FIG. 3.

In some implementations, the phase detector receives data from the output of receiving gate 66 rather than at the input. An example of this is provided in FIG. 6, which includes a system 100 which is similar to system 50 except as follows. In system 100, receiving chip 106 includes a receiver 104 with clock recovery circuitry 108. Clock recovery circuitry 108 includes phase detector 112, mirroring circuitry 120, and phase interpolator 70. In FIG. 6, phase detector 112 and mirroring circuitry 120 receive the gated data rather than the data signal as in FIG. 3. Phase detector 112 and mirroring circuitry 120 may be the same as or similar to phase detector 72 and mirroring circuitry 80 in FIG. 3 except that phase detector 112 and mirroring circuitry 120 may be modified to better handle the gated data signal. Training or test data may be passed through interconnect 58 to get a proper phase information signal and frequency mirrored clock signal prior to passing actual data in a data signal on interconnect 58.

Except for the new features and components, the components and features of system 50 illustrated in FIG. 3 can be the same as or similar to those of prior art system 10 in FIG. 2, or some or more of the components and features of system 50 can be somewhat different. For example, receiving gate 66 can be the same as or different than prior art receiving gate 26; phase interpolator 70 can be the same as or different that prior art interpolator 30, etc.

The SSC transmitting clock signal may be a continuous signal or only operate at around the time data is to be transmitted. Likewise, local reference source 74 may provide the reference clock signal continuously or only around the time data is to be transmitted.

Figure 7:
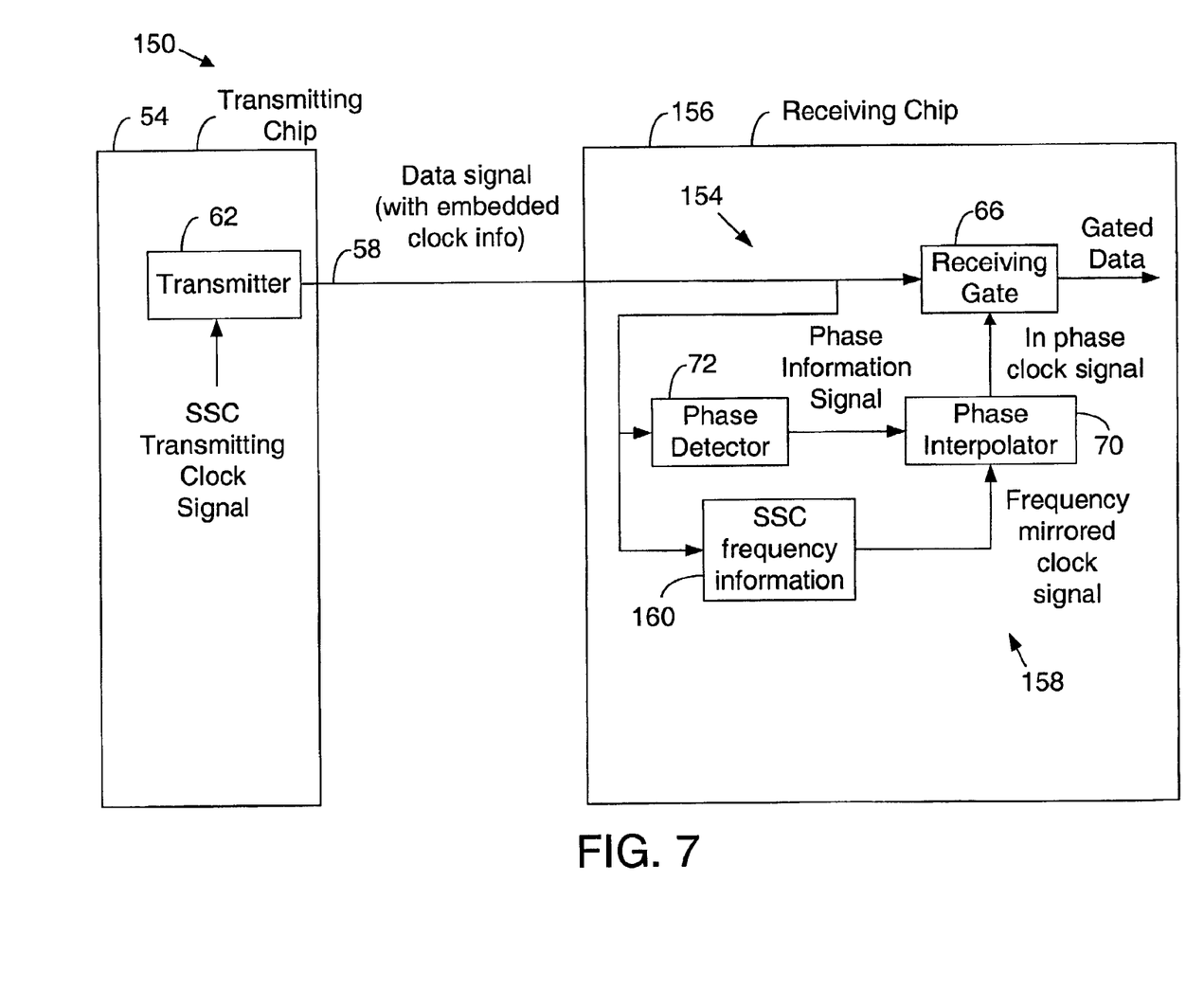
FIG. 7 is a schematic representation of a system having a transmitting and receiving chip wherein the receiving chip includes an SSC tolerant interpolator based receiver according to some embodiments of the invention and is an alternative to the implementations of FIG. 3.

FIG. 7 illustrates an alternative embodiment without the use of a reference clock. Referring to FIG. 7, system 150 is similar to system 50 except that receiving chip 156 includes receiver 154 which in turn includes receiving gate 66 and a clock recovery circuitry 158. Clock recovery circuitry 158 includes a phase detector 72 and SSC frequency information circuitry 160 which produces a frequency mirrored clock signal that mirrors frequency changes in the data signal for phase interpolator 70. SSC frequency information circuitry 160 uses training information, and perhaps a demodulator like that of FIG. 4 or 5, to determine the frequency changing pattern of the data signal as well as the actual frequencies to produce the frequency mirrored clock signal. Following the training data, the frequency change information can be kept updated with additional readings of the data signal. There could be an implementation of system 150 like that of FIG. 6 where the phase detector and/or SSC frequency information circuitry receive inputs from the output of receiving gate 66.

There may be additional circuitry in the chips that is not illustrated such as electrostatic discharge circuitry on interconnect 58.

It is noted that in this disclosures, when it is said one signal is in phase with another it means it is very close to being exactly in phase. When it is said one signal mirrors frequency changes in another it means it is very close to exactly mirroring frequency changes. There will always be some error. Through engineering choices the desired closeness can be increased. The functional matter is whether the gating is done within acceptable tolerances so the proper data is gated from the data signal.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A system comprising:
   an interconnect;
   a transmitting chip including a transmitter to produce a spread spectrum data signal to the interconnect in response to a spread spectrum clocking transmitting clock signal; and
   a receiving chip coupled to the transmitting chip through the interconnect, the receiving chip including:
   clock recovery circuitry to receive the spread spectrum data signal and a reference clock signal and in response thereto to produce an in phase clock signal which is in phase with the spread spectrum data signal and mirrors frequency changes in the spread spectrum data signal, wherein the spread spectrum data signal has embedded clock information and a varying frequency; and
   a receiving gate to receive the spread spectrum data signal and the in phase clock signal and to gate the spread spectrum data signal to produce a gated data signal in response to the in phase clock signal; and
   wherein the clock recovery circuitry includes mirroring circuitry to receive the spread spectrum data signal and the reference clock signal and in response thereto to produce a frequency mirrored clock signal that mirrors frequency changes in the spread spectrum data signal, a phase detector to receive the spread spectrum data signal and in response thereto to produce a phase information signal, and a phase interpolator to receive the phase information signal and the frequency mirrored clock signal and in response thereto to produce the in phase clock signal.

2. The system of claim 1, wherein the mirroring circuitry includes demodulator circuitry to create a signal representative of frequency changes in the spread spectrum data signal.

3. The system of claim 2, wherein the mirroring circuitry includes an RF mixer to frequency modulate the reference clock signal and the signal representative of frequency changes in the spread spectrum data signal.

4. The system of claim 2, wherein the demodulator circuitry histogram analysis.

5. The system of claim 1, wherein the mirroring circuitry includes an RF mixer to frequency modulate the reference clock signal and a signal representative of frequency changes in the spread spectrum data signal.

6. The system of claim 1, further comprising a local reference source to produce the reference clock signal, wherein the reference clock signal has a constant frequency.

7. The system of claim 1, further comprising a local reference source external to the receiving chip to produce the reference clock signal, wherein the reference clock signal has a constant frequency.

8. The system of claim 1, wherein the system is included in a computer system.

9. The system of claim 1, wherein the system is included in a communication system.

10. A system comprising:
a receiving gate to receive a data signal and an in phase clock signal and to gate the data signal to produce a gated data signal in response to the in phase clock signal, wherein the data signal has embedded clock information and a varying frequency; and
clock recovery circuitry to receive the gated data signal and a reference clock signal and in response thereto to produce the in phase clock signal which is in phase with the data signal and mirrors frequency changes in the data signal, wherein the clock recovery circuitry includes:
a phase detector to receive the gated data signal and in response thereto to produce a phase information signal,
mirroring circuitry to receive the gated data signal and the reference clock signal and in response thereto to produce a frequency mirrored clock signal that mirrors frequency changes in the data signal, and
a phase interpolator to receive the phase information signal and the frequency mirrored clock signal and in response thereto to produce the in phase clock signal.

11. The system of claim 10, wherein the mirroring circuitry includes demodulator circuitry to create a signal representative of frequency changes in the data signal.

12. The system of claim 11, wherein the mirroring circuitry includes an RF mixer to frequency modulate the reference clock signal and the signal representative of frequency changes in the data signal.

13. The system of claim 11, wherein the demodulator circuitry includes histogram analysis.

14. The system of claim 10, wherein the mirroring circuitry includes an RF mixer to frequency modulate the reference clock signal and a signal representative of frequency changes in the data signal.

15. The system of claim 10, further comprising:
a transmitting chip including a transmitter to produce the data signal to an interconnect in response to a spread spectrum clocking transmitting clock signal; and
a receiving chip coupled to the transmitting chip through the interconnect, the receiving chip including the clock recovery circuitry and the receiving gate.

16. A system comprising:
clock recovery circuitry to receive a spread spectrum data signal and in response thereto to produce an in phase clock signal which is in phase with the spread spectrum data signal and mirrors frequency changes in the spread spectrum data signal, wherein the data signal has embedded clock information and a varying frequency; and
a receiving gate to receive the spread spectrum data signal and the in phase clock signal and to gate the spread spectrum data signal to produce a gated data signal in response to the in phase clock signal; and
wherein the clock recovery circuitry includes mirroring circuitry to receive the spread spectrum data signal and in response thereto to produce a frequency mirrored clock signal that mirrors frequency changes in the spread spectrum data signal, a phase detector to receive the spread spectrum data signal and in response thereto to produce a phase information signal, and a phase interpolator to receive the phase information signal and the frequency mirrored clock signal and in response thereto to produce the in phase clock signal.

17. The system of claim 16, wherein the minoring circuitry includes demodulator circuitry to create a signal representative of frequency changes in the spread spectrum data signal.

18. The system of claim 16, further comprising:
a transmitting chip including a transmitter to produce the spread spectrum data signal to an interconnect in response to a spread spectrum clocking transmitting clock signal; and
a receiving chip coupled to the transmitting chip through the interconnect, the receiving chip including the clock recovery circuitry and the receiving gate.

19. A system comprising:
a receiving gate to receive a data signal and an in phase clock signal and to gate the data signal to produce a gated data signal in response to the in phase clock signal, wherein the data signal has embedded clock information and a varying frequency; and
clock recovery circuitry to receive the gated data signal and in response thereto to produce the in phase clock signal which is in phase with the data signal and mirrors frequency changes in the data signal, wherein the clock recovery circuitry includes:
a phase detector to receive the data signal and in response thereto to produce a phase information signal,
mirroring circuitry to receive the data signal and in response thereto to produce a frequency mirrored clock signal that mirrors frequency changes in the data signal, and
a phase interpolator to receive the phase information signal and the frequency mirrored clock signal and in response thereto to produce the in phase clock signal.

20. The system of claim 19, wherein the mirroring circuitry includes demodulator circuitry to create a signal representative of frequency changes in the data signal.

21. The system of claim 19, further comprising:
a transmitting chip including a transmitter to produce the data signal to an interconnect in response to a spread spectrum clocking transmitting clock signal; and
a receiving chip coupled to the transmitting chip through the interconnect, the receiving chip including the clock recovery circuitry and the receiving gate.

* * * * *

UNITED STATES PATENT AND TRADEMARK OFFICE
CERTIFICATE OF CORRECTION

PATENT NO.    : 6,937,679 B2
DATED         : August 30, 2005
INVENTOR(S)   : Skinner It is certified that error appears in the above-identified patent and that said Letters Patent is hereby corrected as shown below:

<u>Column 8,</u>
Line 16, delete "minoring" and insert -- mirroring --.

Signed and Sealed this

Sixth Day of December, 2005

JON W. DUDAS
*Director of the United States Patent and Trademark Office*